(12) United States Patent
Sundaram et al.

(10) Patent No.: US 12,296,769 B1
(45) Date of Patent: May 13, 2025

(54) HEAD IMPACT ENERGY ABSORBING BRACKET

(71) Applicant: Zoox, Inc., Foster City, CA (US)

(72) Inventors: Goutham Shanmuga Sundaram, Foster City, CA (US); Michal Jan Swiniarski, Brentwood (GB); Dillon Lawrence Arellano, San Mateo, CA (US); Maria Fernanda Villanueva Ochoa, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/525,182

(22) Filed: Nov. 30, 2023

(51) Int. Cl.
*B60R 21/055* (2006.01)
*B60R 21/04* (2006.01)

(52) U.S. Cl.
CPC .... *B60R 21/055* (2013.01); *B60R 2021/0414* (2013.01)

(58) Field of Classification Search
CPC .................. B60R 21/04; B60R 21/055; B60R 2021/0253; B60R 2021/0293; B60R 2021/0414; B60R 2021/0442
See application file for complete search history.

(56) References Cited

U.S. PATENT DOCUMENTS

| | | | | |
|---|---|---|---|---|
| 5,593,182 A * | 1/1997 | Frost | ..................... | B60R 13/025 296/187.05 |
| 5,609,385 A * | 3/1997 | Daniel | ..................... | B60R 21/04 296/187.05 |
| 5,660,426 A * | 8/1997 | Sugimori | ............ | B60R 13/0206 267/140 |
| 5,709,407 A * | 1/1998 | Stephens | ............... | B60R 13/025 296/187.05 |
| 5,779,270 A * | 7/1998 | Tanaka | ..................... | B60R 21/04 280/808 |
| 5,795,013 A * | 8/1998 | Keller | ..................... | B60R 21/04 296/187.05 |
| 5,967,594 A * | 10/1999 | Ramanujam | ............. | B60N 2/78 280/751 |
| 6,050,631 A * | 4/2000 | Suzuki | .................. | B60R 22/201 296/187.05 |
| 6,142,563 A * | 11/2000 | Townsend | ............ | B60N 2/4228 297/216.13 |
| 6,557,929 B2 * | 5/2003 | Fox | ......................... | B60R 21/04 296/193.06 |
| 6,568,743 B1 * | 5/2003 | Jayasuriya | ............... | B60N 2/78 296/153 |
| 6,905,136 B2 * | 6/2005 | Vidal | ..................... | F16F 7/125 280/752 |

(Continued)

FOREIGN PATENT DOCUMENTS

JP          2007030563 A  *  2/2007

*Primary Examiner* — Laura Freedman
(74) *Attorney, Agent, or Firm* — Lee & Hayes, P.C.

(57) ABSTRACT

An energy absorbing member may be positioned between a passenger and a solid member to mitigate impact of the passenger with the solid member, for instance, during a collision. The energy absorbing member can include a base and a biased member extending from and biased relative to the base. The base may be configured for coupling to a vehicle such that the biased member is disposed between a trim panel and a frame of the vehicle. The biased member may be configured to dissipate energy from an impact proximate the energy absorbing member.

20 Claims, 7 Drawing Sheets

(56) References Cited

U.S. PATENT DOCUMENTS

| | | | | |
|---|---|---|---|---|
| 7,249,662 | B2* | 7/2007 | Itou | F16F 7/12 |
| | | | | 296/187.05 |
| 7,357,444 | B2* | 4/2008 | Cowelchuk | B60R 21/0428 |
| | | | | 296/146.7 |
| 7,513,566 | B2* | 4/2009 | Ludwig | B60R 13/0225 |
| | | | | 280/751 |
| 9,126,636 | B2* | 9/2015 | Ikeno | B60R 21/04 |
| 10,328,887 | B2* | 6/2019 | Dziurda | B60R 21/13 |
| 10,336,276 | B2* | 7/2019 | Tallapragada | B60R 21/0428 |
| 10,583,795 | B2* | 3/2020 | Jindal | B60R 21/045 |
| 11,400,885 | B2* | 8/2022 | Mankame | F03G 7/06115 |
| 11,702,023 | B2* | 7/2023 | Jaradi | B60K 37/10 |
| | | | | 280/748 |
| 11,794,442 | B2* | 10/2023 | Yoshida | B32B 27/36 |
| 2005/0133324 | A1* | 6/2005 | Soto Bailon | B60R 21/04 |
| | | | | 188/377 |
| 2009/0159384 | A1* | 6/2009 | Chitteti | B60R 21/04 |
| | | | | 296/187.03 |
| 2010/0253114 | A1* | 10/2010 | Ohmiya | B60R 21/04 |
| | | | | 296/187.05 |
| 2023/0105662 | A1* | 4/2023 | Yamazaki | B60R 21/04 |
| | | | | 267/141 |

* cited by examiner

HEAD IMPACT ENERGY ABSORBING BRACKET

BACKGROUND

The disclosure herein relates to a device and mechanism for absorbing and dissipating energy from an impact to an interior surface of a vehicle.

Many conventional vehicles include an interior trim paneling that covers various vehicle components like wiring, bolts, structural elements, and the like. Many of these vehicle components are hard and inflexible, which make them unsafe for vehicle occupants in the event of a collision. To mitigate damage during a collision, in some conventional vehicles, the interior trim that covers these components may be soft and/or flexible. Thus, along with providing aesthetic functionality, the interior trim may also provide a barrier between the various solid members of a vehicle and the occupants in the vehicle. Without adequate spacing between the flexible trim and the solid members and protrusions of a vehicle, however, the trim may provide insufficient cushion or give to safely absorb an impact.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
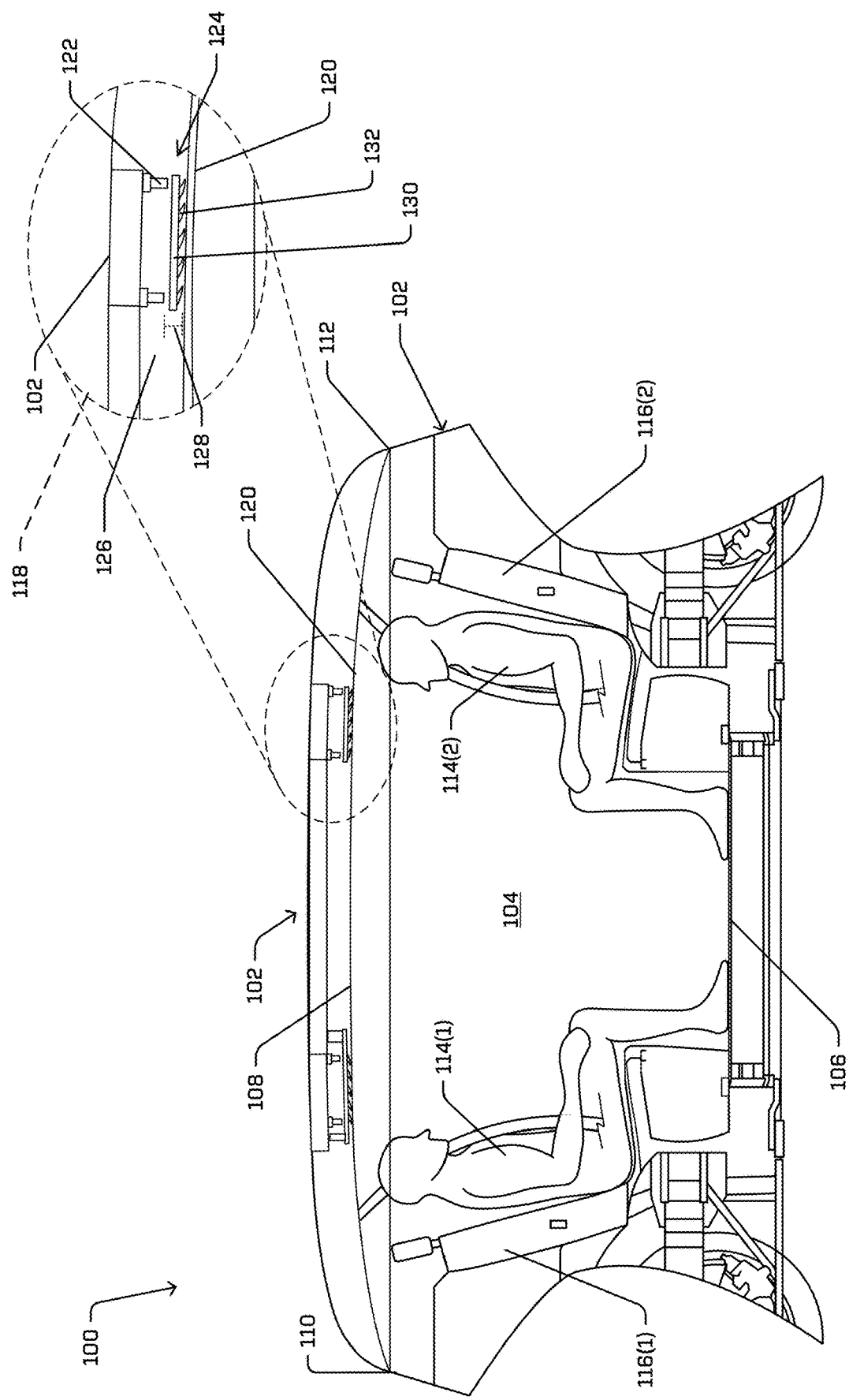
FIG. 1 illustrates a cross-sectional vehicle environment including a vehicle and an energy absorbing member in accordance with one or more examples of this disclosure.

Aspects of this disclosure relate to energy absorbing structures that may be used to mitigate the effects of a collision or similar event. Specifically, aspects of this disclosure may relate to a modular, reusable, and/or customizable spacer that may act as an additional buffer between the interior trim and the various solid members behind the interior trim. For instance, the spacer(s) described herein may absorb and/or dissipate energy resulting from forcible contact with the interior trim of a vehicle.

A primary concern of vehicles, including autonomous vehicles, is occupant safety. Perhaps the most vulnerable, and critical, parts of a human body in the event of a vehicle collision are the head and neck. In some conventional vehicle, autonomous or otherwise, there is interior trim paneling that covers various vehicle components like wiring, bolts, structural elements, climate systems, and the like. For the sake of simplicity, the myriad vehicle components that pose a danger to an occupant who may collide/impact with such components are hereinafter referred to as "solid members." Many of these solid members are hard and inflexible, which make them unsafe for vehicle occupants in the event of a collision. Conventionally, the interior trim paneling covers or masks these solid members. Along with providing aesthetic functionality, the trim paneling may also provide a barrier between the occupants of a vehicle and the various solid members of the vehicle. For instance, the interior trim paneling may be pliable and/or flexible when an occupant or a body part impacts the interior trim paneling of a vehicle as a result of a vehicle collision, a fall, or otherwise, the trim paneling is often designed to flex and provide some cushion between the occupant and the solid member that the occupant would otherwise contact. In more forceful collisions and/or impacts, however, the trim paneling may be an insufficient barrier, acting alone, to adequately protect the occupant from harm. For instance, in these more forceful events, there may be inadequate spacing between the flexible trim and the various solid members of the vehicle to effectively cushion or "give," to safely absorb an impact and dissipate the energy without harming the occupant.

Aspects of this disclosure relate to energy absorbing members that can help mitigate the effects of impacts or other forceful events. For example, the energy absorbing members described herein may be positioned between the trim paneling and a solid member that may harm a passenger of a vehicle.

In some aspects, the energy absorbing members according to this disclosure may include a base that is configured for securing relative to a vehicle, e.g., relative to the vehicle frame, relative to the solid members from which a passenger is to be protected, and/or relative to a vehicle trim. In examples, the solid member(s) may be part of the vehicle frame. The energy absorbing members can also include one or more biased members extending from the base. The biased members may be biased away from the base. In some examples, a biasing member, such as a spring, may provide a bias force to bias the biased members away from the base. In other examples, the base and/or the biased members may have properties and/or configurations that cause the biased members to be biased from the base.

In operation, the energy absorbing members according to this disclosure may be disposed between the trim and the solid members. For example, the biased members may extend from the base toward the trim. In examples, when an occupant or other object contacts the trim proximate the solid member, the biased members may absorb or dissipate energy created by the impact. For instance, the biasing force associated with the biased members may counteract the impact force, e.g., effectively reducing the force of, or otherwise cushioning, the impact.

The present disclosure may provide improvements over some conventional applications. For example, some conventional vehicles incorporate an energy-absorbing foam or other material between the interior trim panels and the various solid members. This energy-absorbing material attempts to dissipate the energy from an impact and thereby safely prevent the occupant from contacting the solid members. However, the foam that may be conventionally used to absorb energy delivered by an impact presents multiple difficulties. For example, the foam material is typically designed to be used a single time. That is, when an impact occurs and the foam is called on to absorb the energy delivered by the impact, it permanently remains in a compressed state. In other words, the foam is not designed to be reusable. This may be one or both of wasteful and expensive. Non-reusable foam that has been compressed by an impact is then required to be thrown away and/or recycled, meaning it has to be removed from behind the interior paneling of the vehicle and dealt with accordingly. As such, a mechanic, technician, or other repairperson is forced to disassemble the interior of the vehicle, remove the effected foam material, dispose and/or recycle it properly, install new, unaffected foam material, and finally reassemble the vehicle to be used again. Without replacing the effected foam, the vehicle cannot safely be used because the lack of impact-absorbing material presents an unprotected and unmitigated danger to an occupant. It is a time-, energy-, and resource-intense endeavor to replace the foam material after every impact, just as it is wasteful and expensive to dispose of every effected piece of foam material and to construct entirely new pieces to replace those that are discarded.

Another challenge presented by the foam material is that it requires a certain amount of volume/space to be effective. That is, a thin layer of energy-absorbing material may not provide enough energy dissipation to safely cushion the occupant upon an impact. Different areas of a vehicle require varying thicknesses of impact-absorbing material based on the location, the likelihood of impact, the protrusion behind the material, and myriad other factors. Further aggravating the issue is the fact that as vehicles become increasingly complex, they require more components and parts. For example, as airbag technology improves, an increasing number of sensors, actuators, and airbags are disposed within a vehicle. Although these technological improvements and additional components provide many benefits, they all have to find the necessary space to be positioned inside the walls of a vehicle. That is, each one of the additional parts and components that is added to vehicles takes up space, and there is a finite amount of available space in a vehicle. Especially since most vehicles are designed to house the vast majority of technological, wiring, speaker, lighting, airbag, climate, and/or other mechanisms, components, and systems behind interior trim panels, the available space is limited and valuable. Relatedly, as more and more parts and components are positioned behind the interior trim panels of the vehicle, more space/volume is required to house those parts and components. As more space/volume is necessary, the interior trim panels are often pulled further into the cabin of the vehicle, which means there is less available volume inside the cabin of the vehicle for occupants, equipment, storage, and/or luggage. Simply, the more space that is required between the frame and the interior trim panels of a vehicle, the less volume there is inside the vehicle for occupants, features, and/or other functionalities.

In light of the challenges presented, along with others also contemplated, the disclosure herein relates to a reusable, modular device that can be disposed in many different positions between an interior trim panel of a vehicle and a frame or other solid member of a vehicle. Aspects of this disclosure may protect an occupant of a vehicle by safely mitigating the effects of an impact with a solid member upon an impact by absorbing and dissipating energy delivered from the occupant into the interior trim panel. Specifically, as an occupant's body or body part impacts the interior trim panel of the vehicle, aspects of this disclosure relate to a customizable device that can safely prevent the occupant from contacting any number of solid members that may be positioned behind the interior trim panel. Unlike the conventional foam material, aspects of this disclosure may relate to a device that can be reused a plurality of times without being replaced. Moreover, the impact mitigation devices according to this disclosure may provide improved impact resistance in a smaller profile than may be required by conventional foam applications. Further, aspects of this disclosure may relate to an impact mitigation device that is configured to be modular. That is, the device(s) can be coupled together in a vast number of ways, angles, and/or positions such that it/they can protect an occupant from myriad dangerous protrusions and/or solid members that may reside behind the trim of a vehicle.

Although aspects of this disclosure are discussed in the context of vehicles, including autonomous vehicles, this disclosure is not so limited. For example, and without limitation, aspects of this disclosure may be used in other vehicles, including aircrafts, nautical vessels, or the like, and/or in other systems in which impact mitigation may be desirable. Aspects of this disclosure now will be described with reference to the Figures.

As shown in FIG. 1, a vehicle 100 includes a frame 102 defining an interior 104 of the vehicle 100. The frame 102 of the vehicle 100 may itself constitute the body of the vehicle 100, or the frame 102 may be defined and/or constrained by the body of the vehicle 100. The body shape, size, and characteristics of the vehicle 100 may be defined by the frame 102, or the frame 102 may define the shape, size, and characteristics of the vehicle 100 body. Alternatively, the frame 102 and the body of the vehicle 100 may constitute the same component and be synonymous. For purposes of simplicity, frame 102 is used herein.

The interior 104 generally defines an occupant-compartment, cargo-compartment, or other compartment. As also illustrated, the interior 104 extends generally in a vertical direction from a vehicle floor 106 to a ceiling 108. The interior 104 also extends in a longitudinal direction, such as between a first end 110 of the vehicle 100 and a second end 112 of the vehicle 100. The interior 104 can also have a lateral dimension (e.g., normal to the viewing plane of FIG. 1) between opposite sides of the vehicle 100. In FIG. 1, the sides of the vehicle 100 have been removed for clarity. As will be appreciated, the frame 102 and other aspects of the vehicle 100 are shown for example only.

The vehicle 100 may be any configuration of vehicle, such as, for example, a van, a sport utility vehicle, a cross-over vehicle, a truck, a bus, an agricultural vehicle, and a construction vehicle. The vehicle 100 may be powered by one or more internal combustion engines, one or more electric motors, any combination thereof, and/or any other suitable power sources. Although the vehicle 100 has four wheels, the systems and methods described herein may be incorporated into vehicles having fewer or a greater number of wheels, tires, and/or tracks. In some instances, the vehicle 100 may have four-wheel steering and may operate generally with equal performance characteristics in all directions. Specifically, the vehicle 100 may be configured for bi-directional travel, such that when the vehicle 100 is travelling in a direction of travel (from left to right in FIG. 1) the first end 110 of the vehicle 100 can be the leading end of the vehicle 100 and the second end 112 can be the trailing end of the vehicle 100, and when the vehicle 100 can be travelling in a direction opposite the direction of travel (from right to left in FIG. 1) the second end 112 can be the leading end of the vehicle 100 and the first end 110 becomes the trailing end of the vehicle 100. These example characteristics may facilitate greater maneuverability, for example, in small spaces or crowded environments, such as parking lots and urban areas.

In the example of FIG. 1, a first occupant 114(1) can be seated in a first seat 116(1), and a second occupant114(2) can be seated in the second seat 116(2). Collectively, the first occupant 1114(1) and the second occupant 114(2) may be referred to herein as "the occupants 114," and one of the first occupant 114(1) or the second occupant 114(2) (or other occupant(s) not shown in FIG. 1) may be referred to generically as "the occupant 114."

The seats 116 are arranged carriage-style such that the first occupant 114(1) and the second occupant 114(2) are facing each other. Accordingly, regardless of the direction of travel, one of the occupants 114 can face in the direction of travel and the other can have their back to the direction of travel. Although the example of FIG. 1 includes only the first seat 116(1) and the second seat 116(2), the first seat 116(1) may be one of a plurality of aligned first seats in a first row of seats, and/or the second seat 116(2) may be one of a plurality of aligned second seats in a second row of seats. Moreover, although the first seat 116(1) and the second seat 116(2) are illustrated as supporting a single occupant 114, in other examples, the seats 116 may be disposed as benches on which more than one occupant 114 may sit. Other relative arrangements and numbers of the seats 116 also are contemplated. Without limitation, all the seats 116 may be arranged to face in a same direction and/or more or fewer seats may be provided. For example, a third row of seats may be disposed in the interior 104.

Given the potential bidirectionality of the vehicle 100, occupants seated in varying arrangements may be at risk of impacting or colliding with a plurality of different locations inside the vehicle 100. For example, an occupant 114 seated with their back towards the direction of travel will face different dangers and/or impact points than an occupant 114 who is seated facing the direction of travel. Further, occupants 114 seated nearer the sides/walls of the vehicle 100 may be vulnerable to different impact locations within the vehicle 100 than occupants 114 who may be seated nearer the center of the vehicle 100. Additionally, occupants 114 may find themselves seated at different angles during different times of a vehicle ride. Ultimately, the ways in which an occupant 114 may collide with the interior trim panels or other interior location within the vehicle 100 are nearly endless. The disclosure herein attempts to facilitate customizability and modularity such that aspects of this disclosure can be employed in myriad locations to protect occupants 114 from the vast number of potential impact locations, protrusions, and/or solid members in a vehicle 100.

As noted above, the vehicle 100 may include the frame 102. The frame 102 of the vehicle 100 may serve many purposes, including but not limited to defining the shape and size of portions of the vehicle 100. For instance, the frame 102 may define exterior and/or interior aesthetic characteristics and designs, aerodynamic properties, cargo capacities, occupant and/or user operations/applications, interior volume/space, and/or myriad other properties of any given vehicle 100. In examples, the frame 102 may generally include any structure that at least in part defines an aspect of the vehicle 100. The frame 102 may be comprised of any number of structures, components, or the like, including those made of metal, polymers, co-polymers, carbon fibers, and/or other materials. The frame 102 may define the position, angle, and/or size of the ceiling 108, walls, and/or floor 106 of the vehicle 100.

Portions of the frame 102 may also provide one or more surfaces to which other features or components of the vehicle 100 are mounted or otherwise attached. For example, and without limitation, in a magnified portion 118 of FIG. 1, the interior of the vehicle includes the frame 102 an interior trim 120 or paneling. The interior trim paneling 120 may serve many purposes and may or may not be visible to occupants 114 of the vehicle 100. For example, the interior trim paneling 120 may primarily be aesthetic, such that the many thousands of components that operate a vehicle 100 and its functions are hidden from the occupants' 114 sight. The interior trim paneling 120 may comprise a variety of materials, that may or may not enhance the functionality. For example, the interior trim paneling 120 may comprise a material that both looks appealing and provides some cushioning such that harm to the occupant 114 is reduced should the occupant 114 bump into or otherwise impact the trim 120.

In addition to providing aesthetic functionality, the interior trim paneling 120 may also be designed to cover up and/or hide various components, systems, and/or mechanisms of the vehicle 100 that pose a potential danger to occupants 114 in the event of a collision. For example, the magnified portion 118 also demonstrates that the trim paneling 120 is disposed to cover (when viewed from the interior of the vehicle 100) a plurality of solid members 122 that protrude from the frame 102 and/or otherwise are associated with the vehicle 100. For example, FIG. 1 shows two bolts as examples of the solid member 122. However, the bolts are for example only. In examples, the solid members 122 may be any component or member that may present a danger to the occupants 114 (or other cargo in the vehicle 100), e.g., should the occupant 114 impact the solid members 122. In some examples, the interior trim paneling 120 may provide sufficient cushion to protect the occupant 114 from scraping, bumping, and/or contacting the solid members 122. Also in examples, the interior trim paneling 120 may serve an important energy mitigation function in such an example. For example, the interior trim paneling 120 may be designed to flex and bend and thereby dissipate the energy delivered by the occupant 114. However, some impacts may involve a greater force such that the interior trim paneling 120, acting alone, may be insufficient to protect the occupant 114 from effects of contacting the bolt or other solid member(s) 122. Accordingly, aspects of the disclosure herein relate to energy absorbing member 124 that may act as an additional buffer and/or energy dissipator between the interior trim paneling 120 and any number of the solid members 122, like the bolts, aspects of the frame 102, and/or the like, that may pose a danger to the occupants 114 during an impact.

Referencing the magnified portion 118 of FIG. 1, the frame 102 of the vehicle 100 and the interior trim 120 may define a space 126. Since there is a finite amount of volume that the interior 104 of a car can have due to the size and shape of the frame 102 and the interior trim paneling 120, the space 126 is constrained in multiple directions. In practice, it may be desirable to limit the size of the space 126 to allow for more interior 104 cargo volume and/or to facilitate a smaller frame 102. As discussed above, there are numerous challenges presented by limiting the size of the space 126. For example, as technology gets smaller and as more components are added to a vehicle 100, each of those components have to find the necessary room in the space 126. That is, each one of the additional parts and components in a vehicle takes up room, and there is a finite amount of available space 126 between the frame 102 of the vehicle and the interior trim paneling 120. Since most vehicles are designed to house the vast majority of technological, wiring, speaker, lighting, airbag, climate, and/or other mechanisms, components, and systems behind the interior trim panels 120, the available space 126 is limited and valuable. Simply, the more space 126 that is required between the frame 102 and the interior trim panels 120 of a vehicle 100, the less volume there is inside the vehicle for occupants, features, and/or other functionalities.

As noted above, a number of components are disposed within the space 126, including the solid members 122. As also shown in the magnified portion 118, based on the arrangement of the frame 102, the trim panel 120, and/or the solid members 122, a clearance 128 that is defined by the distance between the interior trim paneling 120 and the solid member 122 protrusion. The clearance 128 may provide an additional buffer between the various components and/or systems and the interior trim paneling 120. The clearance 128 may represent the maximum available area that the energy absorbing member 124 may occupy. With a finite amount of space 126 between the interior trim paneling 120 and the frame 102, the clearance 128 that is available for an energy absorbing member 124 is limited.

For purposes of clarity, the plurality of components, systems, mechanisms and/or protrusions positioned in the space 126 defined by the interior trim panels 120 and the frame 102 of a vehicle 100 are hereinafter referred to as the "solid members" 122. The interior trim panels 120 may be flexible and/or soft such that they absorb sound and dampen the acoustic noise as well as potential physical forces delivered by an impact. In other words, the interior trim panels may be configured to cushion a physical impact and flex such that they absorb energy delivered by the impact. As discussed above, there may be dozens, hundreds, or even thousands of various instances of the solid members 122 comprised of one or more of the vast number of lighting, wiring, airbag, speaker, climate system, and/or related and unrelated components that reside in the space 126 defined by the frame 102 and the interior trim paneling 120 of the vehicle 100. Should the occupant 114 come into contact with the interior trim paneling 120, the occupant 114 may impact it with such a force that the interior trim paneling 120 contorts or flexes, thereby compressing the space 126 between the frame 102 and the interior trim paneling 120. When the space 126 in between the interior trim paneling 120 and the frame 102 of the vehicle 100 is compressed by an occupant 114 impact, the occupant 114 is in danger of colliding with the various solid members 122 that may be positioned in the space 126. Accordingly, aspects of the disclosure herein relate to the energy absorbing member 124, discussed in more detail below, that attempt to protect the occupant 114 from a potential collision with any number of the hidden or visible solid members 122.

Generally, the energy absorbing member 124 is disposed between the trim 120 and the solid members 122. As detailed further herein, the energy absorbing member 124 generally includes a base 130 and one or more biased members 132 extending from the base 130. In examples, the biased members 132 are biased away from the base 130. In the illustrated example, the biased members 132 are biased toward the interior trim paneling 120. In other examples, it may be beneficial to bias the biased members 132 toward the frame 102 of the vehicle 100 and/or toward the solid member 122. In such examples, the biased members 132 may contact/impact the frame 102 and/or the solid members 122 upon an impact rather than the interior trim paneling 120 and the frame 102 and/or the solid members 122 may form a reactive surface for the biased member 132.

As will be appreciated, the biased members 132 are configured to dissipate the energy resulting from an impact proximate the interior trim paneling 120. For example, the biased members 132 may be biased by a biasing member, e.g., a spring, such that the one or more biased members 132 are configured to provide a resistive force against an impact at the interior trim paneling 120 of the vehicle 100. In the event that an occupant 114 collides with the interior trim paneling 120 with a force sufficient to contort and/or flex the interior trim paneling 120, the interior trim paneling 120 may contact the biased members 132 of the energy absorbing member 124 and further dissipate the impact force, thereby protecting the occupant 114 from harm. In other words, without the energy absorbing member 124, the interior trim 120 may flex and eliminate and/or suppress the space 126 such that the interior trim paneling 120 impacts the solid member 122. An impact force that causes the interior trim paneling 120 to impact the solid member 122 puts the occupant 114 at risk of harm.

The energy absorbing member 124 is configured to be positioned in the clearance 128 between the interior trim paneling 120 and the solid member 122 to protect the occupant 114 in the event of an impact with the interior trim paneling 120. The energy absorbing member 124 may be coupled to any one of, or any combination of, the frame 102 of the vehicle 100, the interior trim paneling 120, and/or the solid member(s) 122 directly. Depending on the size, angle, position, location, and/or risk of impact constraints, along with other considerations contemplated herein, the energy absorbing member 124 may be coupled to any number of locations inside of the vehicle 100 to protect the occupant 114 from impacting the solid member 122. In some examples, the energy absorbing member 124 is positioned such that there is a gap between the energy absorbing member 124 and the solid member 122. The gap between the energy absorbing member 124 and the solid member 122 improves the functionality of the energy absorbing member 124 by allowing the interior trim paneling 120 to absorb as much energy as it is capable of absorbing before contacting the energy-absorbing member(s) 132 of the energy absorbing member 124. The gap may also provide additional distance for the space 126 and/or the clearance 128 to be compressed, thereby increasing the amount of energy that is dissipated before the biased member(s) 130 of the energy absorbing members 124 absorb the remainder of the impact energy. Additionally, the gap may increase the functional lifespan of the energy absorbing members 124 by ensuring that minor impacts or collisions with the interior trim paneling 120 do not deliver a force into the biased members 130 of the energy absorbing member 124 and/or into the energy absorbing member 124 directly. That is, the more minor bumps, collisions, and/or impacts that can be safely and effectively absorbed by the interior trim paneling 120, the fewer strains that the energy-absorbing members are affected by, and the less wear and tear that they are subject to. Accordingly, although the gap between the energy absorbing member 124 and the solid member 122, or the gap between the energy absorbing member 124 and the interior trim paneling 120, are likely to be constrained by the size and/or shape of the space 126 and the clearance 128 available, a larger gap may provide increased benefits.

In another example, the energy absorbing members 124 may be positioned in the clearance 128 such that there is a gap in between the spacer(s) and the interior trim paneling 120. Such a gap may provide similar benefits noted above but would further increase the amount of energy that the energy absorbing members 124 would be capable of absorbing/dissipating before an occupant 114 would be at risk of harm. The size and volume of the space 126 and/or the clearance 130 may largely dictate the amount of available gap area between the energy absorbing member 124 and the solid member 122 and/or between the energy absorbing member 124 and the interior trim paneling 120.

Although the energy absorbing member 124 disclosed herein relates to protecting the occupant in the event they collide with the interior trim paneling 120 of the walls, roof, and/or floor of the vehicle 100, other applications are contemplated. The energy absorbing member 124 described herein may be disposed in other locations of a vehicle to similarly protect the occupant 114 in the event of a collision. In some cases, for example, it may be useful to position the disclosed energy absorbing member 124 under the floor 106 of the vehicle 100, so as to protect the occupant 114 from harm in the event they collide with the floor 106, e.g., during a fall. Further, there may be vertical and/or horizontal posts or frame members that present potential impact locations within the vehicle 100. Additionally, various dashboards, seats, seatbelts, speakers, or other vehicle components may pose potential dangers to the occupant 114. In such instances, it may be desirable to dispose the energy absorbing member 124 in a manner that protects an occupant 114 from a potentially harmful impact, irrespective of the location within the vehicle 100. Although aspects of the disclosure relate to protecting an occupant's 114 head in the event of an impact with a wall or ceiling of the vehicle 100, many applications are contemplated. Virtually any space defined by a potentially harmful solid member 122 and a component of the vehicle 100 may require an energy absorbing member 124. That is, any cavity or location in a vehicle 100 that contains, exposes, or otherwise presents a potential harm to an occupant 114 may require at least one energy absorbing member 114. In examples, energy absorbing member 124 may form part of a vehicle interior and may include an integrated trim piece, for example, that may be contacted by a vehicle occupant. Energy absorbing member 124 may include cushioning material, fabric, plastic, wood, or any other material that would formal an interior piece of a vehicle.

Figure 2A:
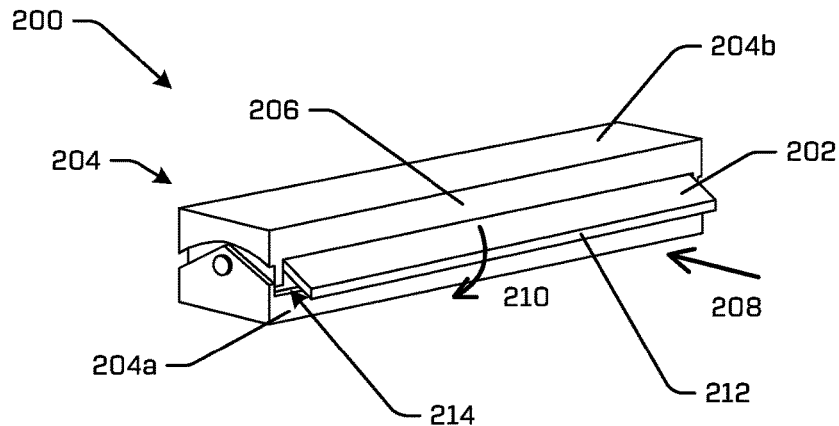
FIGS. 2A and 2B are perspective and exploded perspective views, respectively, of an energy absorbing member in accordance with one or more examples of this disclosure.
Figure 2B:
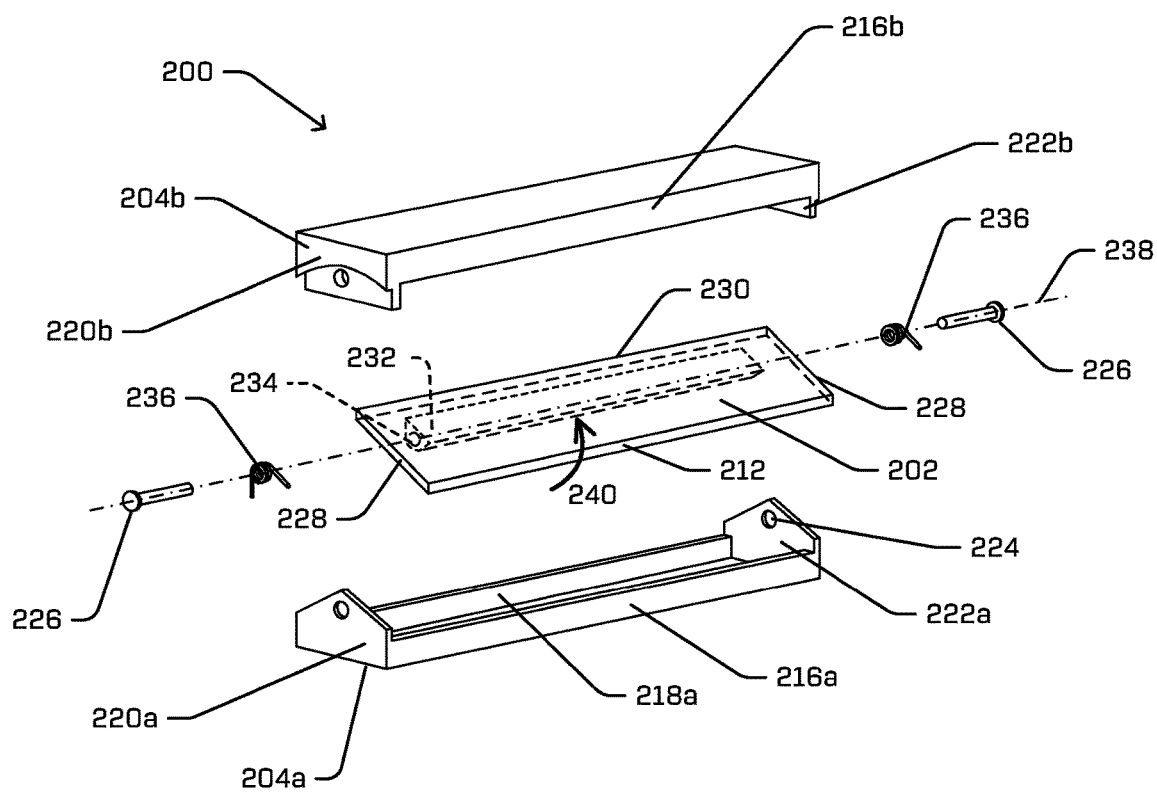

FIGS. 2A and 2B show an example of an energy absorbing member 200, which may be an example of the energy absorbing member 124. Specifically, FIG. 2A is a perspective view of the energy absorbing member 200, and FIG. 2B is an exploded perspective view of the energy absorbing member 200. As detailed further below, the energy absorbing member 200 can include one or more instances of the energy absorbing member 200. For instance, and without limitation, individual instances of the energy absorbing member 200 may be modular such that they may be coupled together at various angles, positions, and/or layouts to allow customization and best fit a prescribed location. For instance, depending on space limitations, a shape and/or size of a solid member to protect a passenger from, the likelihood of an area to be impacted by an occupant, and/or other pertinent factors, instances of the energy absorbing member 200 may be stacked, aligned, positioned, and/or rotated accordingly to comprise one or more instances of the energy absorbing member 200 that is/are best situated to protect an occupant from the solid member. In some instances, an individual instance of the energy absorbing member 200 may comprise the energy absorbing member 200, e.g., by being singularly disposed to provide passenger protection, as detailed further herein.

Referring to FIGS. 2A and 2B, the energy absorbing member 200 includes a biased member 202, e.g., formed as a fin, configured to move relative to a base 204. For example, the biased member 202 is configured to extend from the base 204 and is biased at least partially away from the base 204. In the example, the biased member 202 extends from a face 206 of the base 204. In the illustrated example, the biased member 202 extends from the face 206 at an angle, e.g., a non-normal angle.

The energy absorbing member 200 is configured to dissipate or absorb a force applied generally along a direction of the arrow 208 in FIG. 2A. For instance, during a collision or similar event, a passenger, e.g., the passenger's head, may travel in the direction of the arrow 208. Contact with the biased member 202, e.g., through a trim, like the trim 120, discussed above, will cause the biased member 202 to deflect, generally in the direction of the arrow 210. Moreover, because the biased member 202 is biased to the position shown in FIG. 2A, e.g., in a direction opposite the arrow 210, the biasing counteracts the force contacting the biased member 202, e.g., to effectively cushion or dissipate energy from the contact.

The biased member 202 is configured to extend from the base 204 of the energy absorbing member 200. The biased member 202 may take on many forms/shapes/designs and be made from myriad materials. In the illustrated example, the biased member 202 is a generally planar member with a leading edge 212 that extends from the face 206 of the energy absorbing member 200. The leading edge 212 may comprise a fin. As noted above, the biased member 202 may be biased in a first direction, away from the face 206, such that the biased member 202 resists a linear compressive force delivered by an impact, e.g., generally along the direction of the arrow 208.

As also shown in FIGS. 2A and 2B the base 204 includes a first base member 204a that is configured to be coupled to a second base member 204b. When coupled, as in FIG. 2A, the base members 204a, 204b define an opening 214 through which at least a portion of the biased member 202 extends. As best shown in FIG. 2B, the first base member 204a is a generally elongate member having a first side 216a and a second side 218a extending between a first end 220a and a second end 222a. Similarly, the second base member 204b is a generally elongate member having a first side 216b and a second side (obscured so as to be not visible in FIG. 2B) extending between a first end 220b and a second end 222b. In examples, the first side 216a of the first base member 204a and/or the first side 216b of the second base member 204b may form the face 206 discussed above. Also, when assembled, the first side 216a of the first base member 204a and the first side 216b of the second base member 204b are configured to define the opening 214.

In the example of FIGS. 2A and 2B, holes 224 are provided through the first ends 220a and the second ends 220b of the base members 204a, 204b. To assemble the energy absorbing member 200, the holes 224 may be aligned, and pins 226 may be disposed in the aligned holes 224 to couple the first base member 204a to the second base member 204b, to form the base 204.

As illustrated in FIG. 2B, the biased member 202 may be a substantially planar member extending longitudinally between opposing ends 228 and laterally between the leading edge 212 and an opposite, trailing edge 230. The biased member 202 also includes a mount 232 formed on a surface of the biased member 202. The mount 232 defines one or more holes 234 that align with the holes 224 in the base 204. When the pins 226 are inserted into the holes 224 to couple the first base member 204a to the second base member 204b, the pins 226 also extending into the hole(s) 234 in the mount 232 of the biased member 202, thereby coupling the biased member 202 to the base 204.

As also illustrated in FIG. 2B, biasing members 236 are disposed to contact the biased member 202 when the energy absorbing member 200 is assembled. In the example of FIG. 2B, the biasing members 236 are illustrated as torsion springs configured to be placed on the pins 226 between the mount 232 and the ends 220b, 222b of the second base member 204b. For example, the torsion spring may have a first end that contacts a surface of the biased member 202 and a second end that contacts the base 204 to bias the biased member 202 away from the base 204. In the example of FIGS. 2A and 2B, the biasing members 236 may bias the biased member 202 to rotate about a longitudinal axis 238, generally coaxial with the pins 226, e.g., in a counterclockwise direction generally shown by an arrow 240.

As will be appreciated from the foregoing, the energy absorbing member 200 generally includes the base 204 and the biased member 202 extending generally therefrom. In this example, the biased member 202 may be configured to rotationally resist and/or dissipate the energy delivered by an impact. Thus, in the example of FIGS. 2A and 2B, the biased member 202 may rotate about the longitudinal axis 238 against the force of the biasing member(s) 236.

In the example of FIGS. 2A and 2B, the size of the opening 214 generally defines a permitted travel of the biased member 202. More specifically, the biasing member 236 biases the biased member 202 to contact the second base portion 204b, e.g., proximate the first side 216b of the second base portion 204b. When a force is applied against the biasing force, e.g., due to an impact generally along a direction of the arrow 208, the biased member can pivot, as discussed above generally in the direction of the arrow 210, until the biased member contacts the first base portion 204a, e.g., contacts the first side 216a of the first base portion 204a. As will be appreciated, the distance travelled by the biased member 202, e.g., travelled by the leading edge 212 of the biased member 202, as well as the force applied by the biasing member 236, will correlate with an amount of energy that can be dissipated by the energy absorbing member 200.

Aspects of this disclosure can also allow for tuning or altering the energy absorbing properties of the energy absorbing member 200. For example, and without limitation, the biasing member 236 may be sized or otherwise selected to provide a desired biasing force on the biased member 202. In other examples, the size of the opening 214 may be altered e.g., by varying the size and/or configuration of aspects of the first base member 204a and/or of the second base member 204b. For instance, a height of the first side 216a of the first base member 204a and/or a height of the first side 216b of the second base member 204b may be varied to change an extent, e.g., a height, of the opening 214.

As also illustrated in FIGS. 2A and 2B, the first base member 204a and the second base member 204b may be movable relative to each other, which may alter aspects of the opening 214. More specifically, in the illustrated example, the first end 220a of the first base member 204a and the first end 220b of the second base member 204b (as well as the second end 222a of the first base member 204a and the second end 222b of the second base member 204b) may be configured to facilitate pivoting of the first base member 204a relative to the second base member 204b about the pins 226. In the illustrated example, the first end 220b and the second end 222b of the second base member 204b are offset along the longitudinal axis 238 from the first end 220a and the second end 222a of the first base member 204a, such that the two members 204a, 204b can rotate independently. In the illustrated example, the ends 220a, 222a of the first base member 204a have a first profile that cooperates with a second profile formed on the ends 220b, 222b of the second base member 204b. In the example, the first profile includes two angled sides, and the second profile is an arcuate profile. The profiles may be configured to define a degree of relative rotation of the first base member 204a relative to the second base member 204b. For instance, the profiles may be configured such that the first profile and the second profile contact to inhibit further relative rotation.

As will be appreciated, rotating the first base member 204a relative to the second base member 204b may also result in a widening or narrowing of the opening 214. Accordingly, the allowable travel of the biased member 202 may be altered by rotating the first base member 204a relative to the second base member 204b. The relative rotation of the first base member 204a and the second base member 204b may also have other benefits. For example, the relative rotation may facilitate placement of the energy absorbing member on differently contoured surfaces. For instance, the relative rotation described will create an angle between the second side 218a of the first base member 204a and a corresponding second side (obscured in FIGS. 2A and 2B) of the second base member 204b. The angle may better allow the energy absorbing member 200 to match a contour or profile of a trim piece behind which the member 200 is to be placed and/or of a solid member in front of which the member 200 is to be placed.

Other modifications also are contemplated. For example, the biased member 202 may extend from the base 204 at an angle that is substantially perpendicular such that the biased members 202 contact the interior trim panel at a greater distance from the energy absorbing member 200. Such a configuration would leave more space for the biased member 202 to flex on impact and/or to dissipate the impact force. Any combination of materials and/or angles of the biased members 202 may be employed to best suit the needs of a particular solid member or location. Depending on the location, potential impact angles, available space, and/or other limiting factors, the biased members 202 may be biased at a more acute and/or obtuse angle or otherwise customized to fit the particular needs of the vehicle location. In an example where the size of the space and the solid member allow the biased members 202 to be biased from the base 204 at a more obtuse/wider angle, the impact resistance and energy dissipation qualities may be more effective. Relatedly, in a location that has a limited amount of space between the interior trim panel and the solid member, the biased member 202 may be comprised of a more rigid material or may extend from the base 204 at a more acute angle. Such a configuration may allow the energy absorbing member 200 to fit in smaller locations while still provide energy-absorption and/or dissipation qualities, as detailed further herein.

In another example modification, the biased members 202 may extend from both sides of the spacer base 204. That is, second biasing members (not shown) may extend from the second side 218a. In such an example, the second biasing members may be designed to contact any combination of the interior trim panel, the frame of the vehicle, and/or the solid member upon impact. In other words, with the biased members disposed on both sides of the base 204, the energy absorbing member 200 may be capable of absorbing and dissipating more energy.

In the example of FIGS. 2A and 2B, the base 204 may facilitate attachment of the energy absorbing member 200 to any one of, or any combination of, the frame of the vehicle, the interior trim panel of the vehicle, to a solid member directly, or any other feature of the vehicle. In some examples, the energy absorbing member 200 may be positioned to leave a gap or space between the solid member and the energy absorbing member 200 such that the energy absorbing member 200 is not in direct contact with the solid member(s). For instance, the base 204 of the energy absorbing member 200 may be secured to a frame or other element to facilitate maintaining a gap between the solid member(s) and the fins 202 may contact or otherwise be arranged proximate the trim In other examples, the energy absorbing member 200 may be positioned to float in between the interior trim panel and the solid member such that there is a gap between the trim panel and the energy absorbing member 200. Such a disposition allows the interior trim panel to absorb some amount of energy before the energy absorbing member 200 is contacted to dissipate the rest of the energy delivered by an impact.

Although not illustrated in FIGS. 2A and 2B, the base 204 may be secured to the frame, the interior trim panel, or the solid member by any one of, or any combination of, a bolt, a nut, a screw, a rivet, a mushroom pin, or other similar fastener mechanism. For example, fastening mechanisms can include one or more of an opening, a threaded hole, a post, a threaded post, a snap, an adhesive, and/or any other fastening mechanism. For example, and without limitation, the obscured side (e.g., corresponding to the side 218a) may have one or more features for securing the energy absorbing member 200 in a desired location and orientation.

In examples, the energy absorbing member 200 is disposed in a space between a trim panel and a frame (e.g., the space 126) without directly contacting the solid member. Until the interior trim panel is impacted and the space between the trim panel and the solid member is compressed, the energy absorbing member 200 would not be in direct contact with the solid member. In other words, once an impact occurs, the force delivered by the impact flexes the interior trim panel into the biased member 202 of the energy absorbing member 200, which, dissipate the energy from the impact without contacting the solid member. With a sufficient force, the energy absorbing member 200, may contact the solid member and further absorb the energy delivered by the impact, e.g., by deflection of the biased member 202 relative to the biasing members 236. Leaving a gap between energy absorbing member 200 and the solid member may increase the usable life of the energy absorbing member 200 by decreasing the wear and tear from repeated impacts, and may also increase the efficacy of the energy absorbing member 200 by allowing the interior trim paneling and/or the biased members 202 to absorb as much energy as possible before the solid member is contacted. That is to say, the safest result of such an occupant impact would be to maintain the gap/space between the energy absorbing member 200 and the solid member, without contacting the solid member at all. The noted benefits are not limiting.

Figure 3:
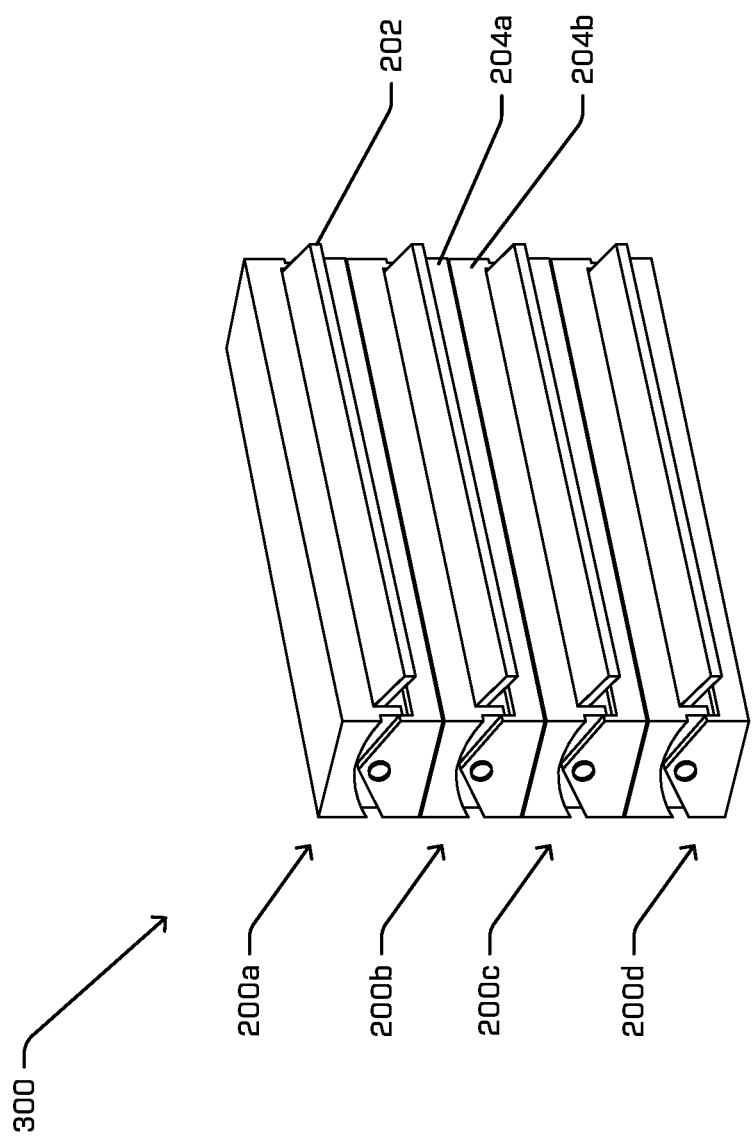
FIG. 3 is a perspective view of an alternative energy absorbing member in accordance with one or more examples of this disclosure.

FIG. 3 is a perspective view of an alternative energy absorbing member 300. The energy absorbing member 300 includes four instances of the energy absorbing component 200. Specifically, the energy absorbing member 300 includes a first instance of the energy absorbing component 200a, a second instance of the energy absorbing component 200b, a third instance of the energy absorbing component 200c, and a fourth instance of the energy absorbing component 200d coupled together.

As illustrated by the example of FIG. 3, the energy absorbing member 200 discussed above may be a modular member that can be coupled to or otherwise used with additional instances of the member 200 to form different configurations and energy absorbing systems, including the energy absorbing member 300. Although FIG. 3 shows four instances of the energy absorbing member 200, more or fewer instances may be provided. For example, more or fewer of the instances may be used based on a location in which the energy absorbing member 300 is to be used. The modularity of the energy absorbing member 200 may provide numerous benefits. For example, in some instances, the energy absorbing members 200 are substantially identical to one another, which may reduce manufacturing costs. When energy absorbing members 200 are interchangeable and/or compatible with one another, the manufacturing process of the energy absorbing members 200 is simplified and streamlined, thereby reducing cost and increasing production. Further, the modularity of the energy absorbing members 200 may reduce obstacles to replacing members that are malfunctioning and/or worn to a point that they are unsafe or unfit for use in a vehicle. That is, an energy absorbing member 200 that is faulty, broken, worn out, or otherwise unsuitable for use is far easier to replace when other energy absorbing members 200 are substantially identical. This modularity may decrease the time and resources it takes to get a vehicle back to a safe working condition.

When energy absorbing members 200 are reciprocal, it is less of a burden to orient and/or position one or more energy absorbing members 200 in a specific location with unique constraints. In other words, the reusability and modularity of the energy absorbing members 200 allow for safe and effective use in a vast number of positions, angles, orientations, and/or situations depending on the restrictions of any given location and/or solid member.

In the example of FIG. 3, the instances of the energy absorbing member 200a-200d are "stacked," e.g., with the first base member 204a of one of the members coupled to a second base member 204b of an adjacent one of the members. In the illustrated example, the energy absorbing member 300 approximates a "block" or other structure in which four instances of the biased member 202 are generally parallel to (and spaced from) each other. Also in the example, the biased members 202 generally all deflect in the same direction. As will be appreciated, the energy absorbing member 300 can provide a greater surface area to mitigate impacts, relative to (a single instance of) the energy absorbing member 200.

In other examples, the instances of the energy absorbing members 200a-200d may be other than aligned with each other. Without limitation, adjacent of the instances of the energy absorbing members 200a-200d may be offset relative to each other longitudinally, laterally, or otherwise. Moreover, adjacent of the members 200a-200b may be rotated relative to each other. In one non-limiting example, one or more of the instances may be turned "upside-down" such that the angle at which the biased member extends is opposite that shown. Thus, for example, an impact with the biased members may cause a first subset of the biased members to rotate in a counterclockwise direction and a second subset of the biased members to rotate in a clockwise direction.

Additionally, or alternatively, the individual instances of the energy absorbing members 200a-200d may vary. For instance, and without limitation, attributes of the biased members 202, including an angle, a distance, a resiliency, a material, and/or the like can vary between instances 200a-200d. Aspects of the biasing members 236 may also be altered. For example, relatively more or less rigid springs may be used to alter the biasing force. As will be appreciated, a more rigid spring will provide a stronger resistance to impact forces.

Also in examples, and as noted above, the energy absorbing member 200 may facilitate relative pivoting of the first base member 204a and the second base member 204b. When multiple instances are coupled as in the example energy absorbing member 300, different contours can be created. Accordingly, This configurability may allow for the energy absorbing member 300 to fit the space and shape requirements of a specific location. This modularity allows the shape of the energy absorbing module 200 to congruently align with the contours of the interior trim panel and/or to fit snugly against the paneling or to the exterior frame depending on the particular limiting factors dictated by the location. Because the energy absorbing member 300 may be capable of aligning with the interior trim panel, the member 300 may better suited to fit the specific size and shape requirements of a given location and/or may be more effective in absorbing impacts and dissipating energy. In a typical vehicle, there are few flat/straight interior surfaces, walls, and/or ceiling panels, so it may be desirable for the member 300 to be able to pivot to match any given interior trim panel contour without sacrificing space or energy-absorption qualities.

The instances of the energy absorbing members 200a-200b comprising the energy absorbing member 300 may be coupled in a number of ways. The following are non-limiting examples of mechanisms to couple the individual energy absorbing members 200, and thereby facilitate the modularity, such as in the energy absorbing member 300. In one example, the instances of the energy absorbing members 200a-200d may be stacked on and/or attached to another other instances by a set of associated studs and receptacles. For example, each of the energy absorbing members 200a-200d may include a plurality of studs on a top (as oriented in FIG. 3) of the energy absorbing members 200a-200d, and a plurality of cooperating receptacles on the bottom of the energy absorbing members 200a-200d. The use of the studs and the receptacles may allow for a non-permanent coupling together. Other coupling mechanisms also are contemplated. For example, a plurality of hooks and loops, grooves and rails, a clasping or click-together mechanism, and/or a magnetic material may be disposed on the energy absorbing members 200a-200d such that they can couple together.

Employing non-permanent coupling mechanisms and/or materials may be beneficial in that it they make it easier and cheaper to later replace individual of the energy absorbing members 200a-200d, e.g., due to wear and tear, malfunction, deformation, and/or destruction. However, the use of a permanent coupling mechanism like glue, epoxy, tape, or otherwise, may also be used. For example, an adhesive may be used to couple a plurality of the energy absorbing members 200a-200d together. In examples, the adhesive may provide better security and/or reliability in locations that are difficult to access. In such an example, it may be useful to permanently couple a plurality of the energy absorbing members 200a-200d to ensure their connection and/or to avoid any potential uncertainty about their location and/or position.

Figure 4B:
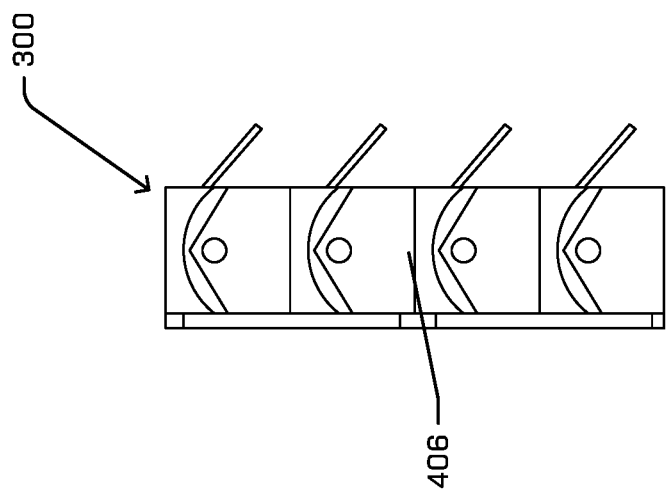
FIGS. 4A-4C show additional examples of energy absorbing members in accordance with additional examples of this disclosure.
Figure 4A:
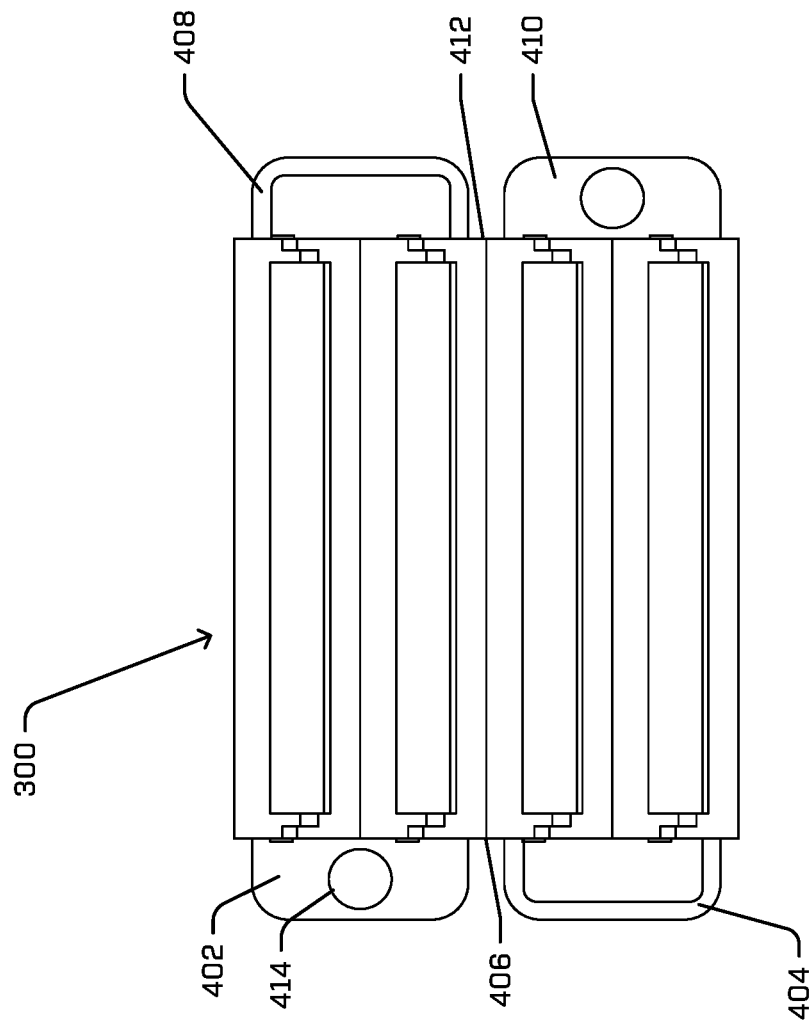

As with the example of FIGS. 2A and 2B, the energy absorbing member 300 can be coupled to a vehicle in a number of ways. For example, one or more of the instances of the members 200a-200d can include mounting features, as detailed above. FIGS. 3A and 3B show another example for mounting the energy absorbing member 300. Specifically, FIG. 4A is a front view and FIG. 4B is a side view of the energy absorbing member 300 discussed above. In this example, additional features are coupled to portions of the energy absorbing member 300.

In the illustrated example, As shown, a first connecting bracket 402 and a first receiving bracket 404 may be disposed on a first lateral side 406 of the energy absorbing member 300. Similarly, a second receiving bracket 408 and a second connecting bracket 410 may be disposed on a second lateral side 412 of the energy absorbing member 300. The second lateral side 412 is opposite the first lateral side 406. The second connecting bracket 410 and the second receiving bracket 408 disposed on the second lateral side 412 are positioned opposite the first connecting bracket 402 and the first receiving bracket 404 disposed on the first lateral side 406 of the spacing energy absorbing member 300, respectively. That is, the first connecting bracket 402 on the first lateral side 406 is (in the orientation of FIG. 4A) horizontally across from the second receiving bracket 408 on the second lateral side 412, and the first receiving bracket 404 on the first lateral side 406 is horizontally across from the second connecting bracket 410 on the second lateral side 412. Such a configuration allows energy absorbing member 300 to be coupled together. Alternatively, the configuration may be flipped horizontally or vertically. The specific layout of the connecting and receiving brackets on the energy absorbing member 300 is not critically important as long as they are disposed in a manner that allows repetitive modularity.

Figure 4C:
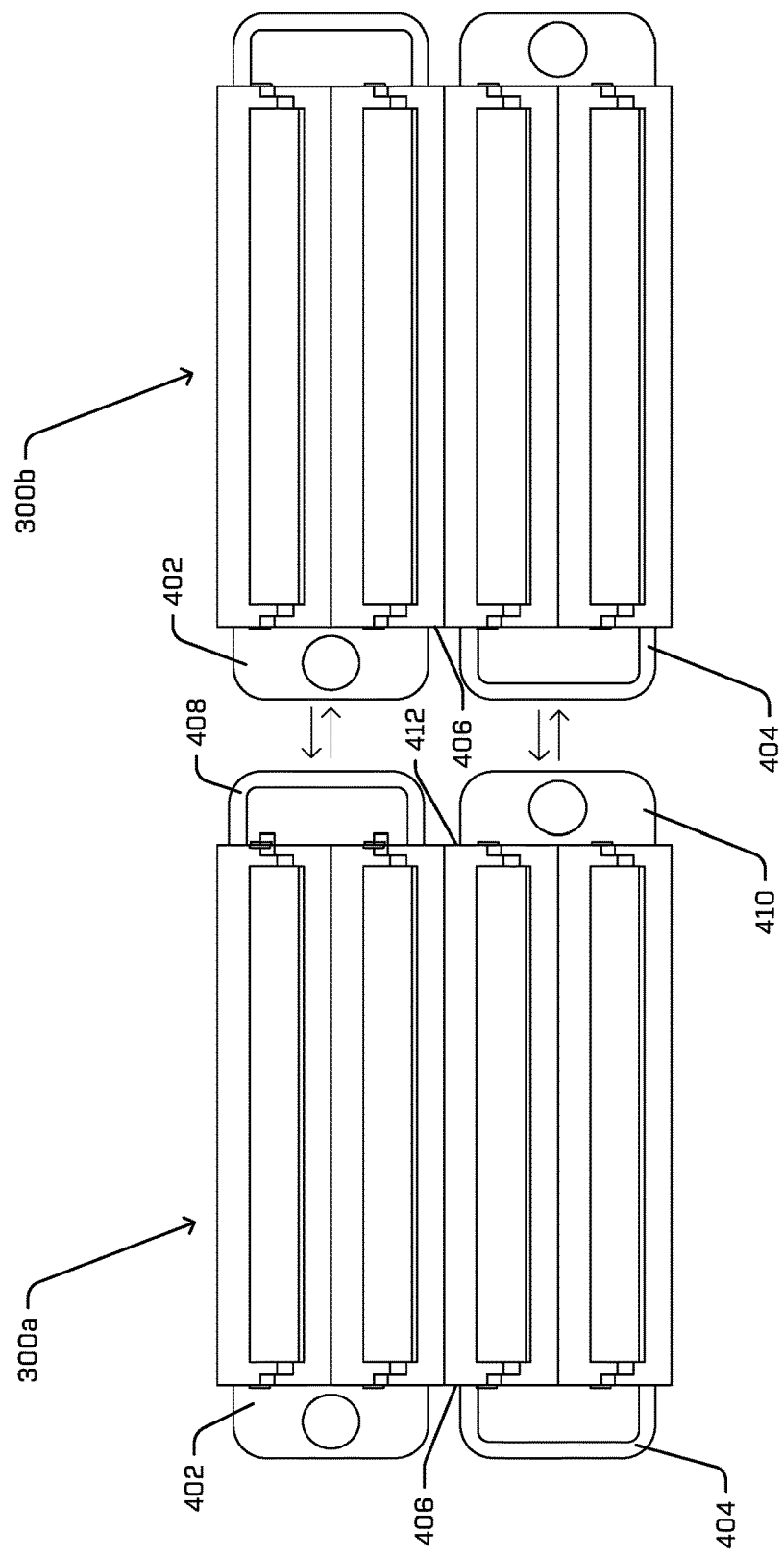

In examples, the connecting brackets 402, 410 include holes 414. The holes 414 may be configured to receive a fastener, e.g., to facilitate coupling of the energy absorbing member 300 to a vehicle component. In examples, the holes 414 may receive a dowel, pin, bolt, screw, or other member to facilitate attachment. In examples, the holes 414 may alternatively be formed as slots, slits, or other openings. Also in examples, instead of the holes 414, the connecting brackets 402, 410 may include other features for mounting the energy absorbing member 300. Without limitation, the connecting brackets 402, 410 may include posts, threads, clasps, clips, and/or other attachment features. In still further examples, the connecting brackets 402, 410 may be devoid any specific mounting feature, instead providing only a generally planar surface to facilitate mounting, e.g., using an adhesive or other fastener. The connecting brackets 402, 410 may also, or alternatively, be configured to attach instances of the energy absorbing member 300. Specifically, and as shown in FIG. 4C, a first instance of the energy absorbing member 300a and a second instance of the energy absorbing member 300b may be coupled in a side-by-side manner. Specifically, as shown in FIG. 4C, the second connecting bracket 408 on the second lateral side 412 of the first instance of the energy absorbing member 300a is configured to be coupled to the first receiving bracket 404 on the first lateral side 406 of the second instance of the energy absorbing member 300b. Similarly, the first connecting bracket 402 on the first lateral side 406 of the second instance of the energy absorbing member 300 can concomitantly couple to the second receiving bracket 408 on the second lateral side 412 of the first instance of the energy absorbing member 300a. The opposing connecting and receiving brackets on each side of each spacing module allow lateral/horizontal modularity such that a plurality of the energy absorbing member 300 can be coupled together side to side. This modular configuration better allows a spacing module to fit the particular space, size, and shape requirements of a particular location. The connecting and receiving bracket mechanism may be configured to permanently or non-permanently couple the spacing module(s) 300 together. In an example, the connecting and receiving brackets may be configured to engage with one another using a snap-together or interlocking mechanism. Such a mechanism would allow coupling and installation without any other tools and may allow for quicker/easier connection or disconnection and replacement. In another example, the first connecting bracket 402 on the first lateral side 406 of the second instance of the energy absorbing member 300*b* is disposed with a magnet and the second receiving bracket 408 of the second lateral side 412 of the first instance of the energy absorbing member 300 may be disposed with a magnet having a second, opposite polarity of the first magnet. The examples presented herein are not limiting, and merely describe potential configurations of the connecting/receiving brackets that preferably allow semi- or non-permanent coupling. Other lateral coupling mechanisms are contemplated herein.

Alternatively, the connecting and receiving brackets may be configured to adhere to one another using glue, tape, hook and loop fabric, or another similar agent. There may be specific benefits of using any one of the noted coupling mechanisms/agents over others. For example, the connecting and receiving bracket mechanism shown in FIG. 4C may be better suited for a common impact location, such as, for example, the interior trim paneling directly above an occupant seat. Such a mechanism allows for quick and efficient replacement and installation of spacing module(s) where they may be subject to more wear and tear. On the other hand, in a location that may be more difficult to access and be subjected to fewer collisions/impacts, like a wall panel behind a seat headrest, for instance, a more permanent lateral attachment mechanism like glue or strong magnets may be preferable. A permanent lateral attachment mechanism may avoid potential uncertainty about the location and/or position of the energy absorbing member 300 over time due to shaking/jostling and/or collisions with other vehicles or objects.

In another example, the lateral attachment mechanism may comprise a slide mechanism. For example, a lateral side of one instance of the energy absorbing member 300 may comprise a track or rail component, and an opposing lateral side of a second instance of the energy absorbing member 300 may comprise a sliding carriage configured to couple to the track or rail component of the first instance of the energy absorbing member 300. In such an example, the sliding carriage is configured to slide linearly into the track or rail component, thereby securing the energy absorbing members 300. Although the sliding mechanism may be permanent or non-permanent, a non-permanent mechanism may be preferable so that the energy absorbing members 300 can be reused and re-coupled with other energy absorbing member 300. Additionally, a non-permanent sliding mechanism allows the energy absorbing member 300 to be replaced in the event of a malfunction or wear and tear such that a new instance of the energy absorbing member 300 is required. Other coupling arrangements may also be used to provide these and/or other benefits.

Figure 5B:
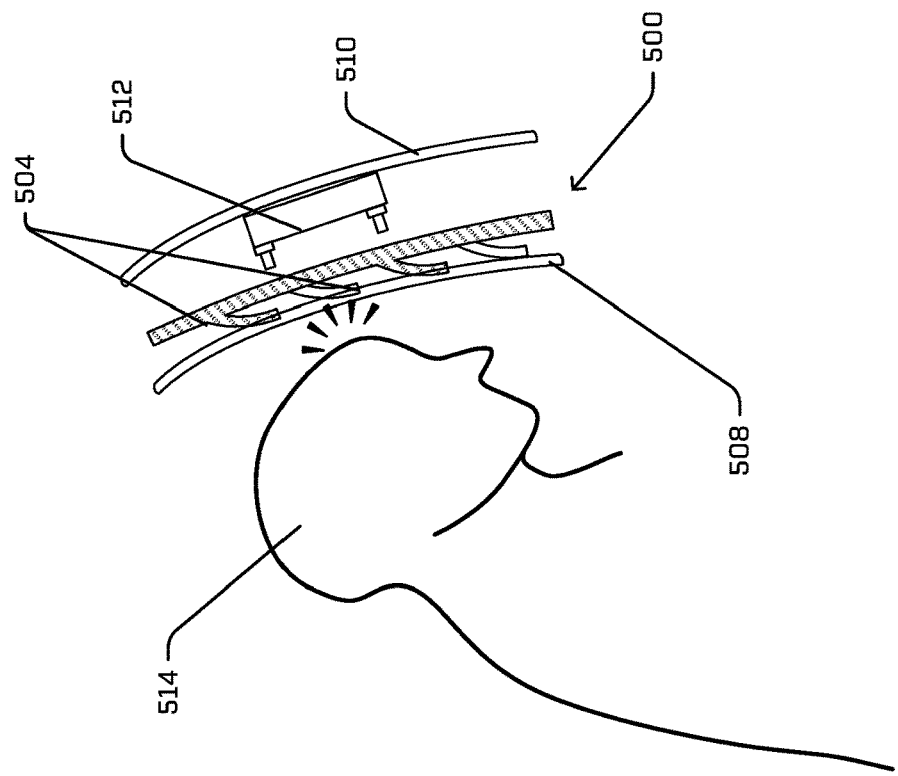
FIGS. 5A and 5B show an additional example of an energy absorbing member and an associated use case for the energy absorbing member, in accordance with aspects of this disclosure.
Figure 5A:
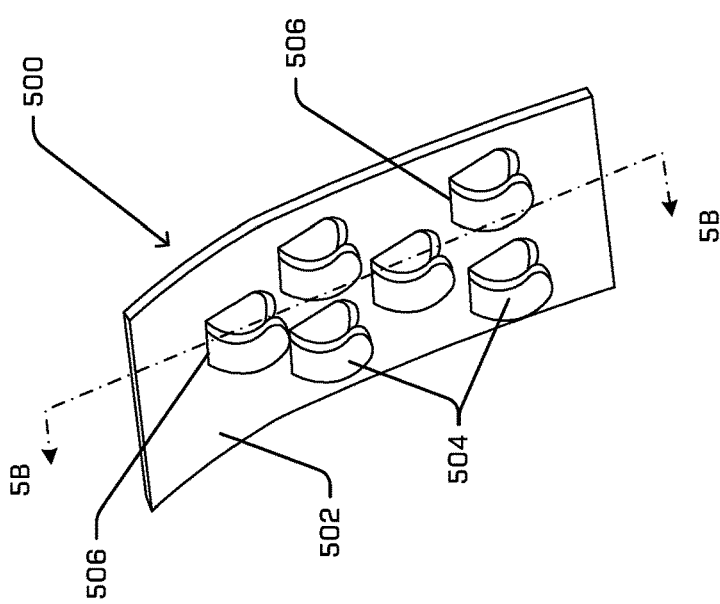

Additional examples of the energy absorbing member also are contemplated. For example, FIGS. 5A and 5B depict an additional example contemplated herein. FIGS. 5A and 5B show a perspective view of an energy absorbing member 500 and an example use case of the energy absorbing member 500, respectively. Specifically, and as illustrated best in FIG. 5A, the energy absorbing member 500 includes a base 502, generally formed as a substrate, and a plurality of biased members 504 extending from the base 502. The biased members 504 are biased in a first direction away from the base 502.

In the example of FIG. 5A, the base 502 and the biased members 504 may be integrally formed. For example, the base 502 and the biased members 504 may be formed of a single material, e.g., sheet metal, carbon fiber, a polymeric material, or the like. For instance, the biased members 504 may be cut or otherwise separated from the base 502 and subsequently bent or otherwise positioned relative to the base 502, e.g., at a connection 506 between the base 502 and the biased members 504. In some examples, the connection 506 may act as a resilient or living hinge about which the respective biased member 504 may flex relative to the base 502. For instance, the biased members 504 may have a sufficient rigidity that they maintain the illustrated position under no loading, but can flex, at the connection 506, relative to the base 502 in response to an applied force that is substantially normal to the base 502.

FIG. 5B is an example use case of the energy absorbing member 500. Specifically, in FIG. 5B the energy absorbing member 500 is shown in cross-section, taken along the line 5B 5B in FIG. 5A. In FIG. 5B, the energy absorbing member 500 is disposed between a trim panel 508 and a frame 510 of a vehicle. As illustrated, the base 208 has a contour that generally matches a contour of the interior trim panel 508. In this example, the base 502 may be at least partially flexible, e.g., as a flexible substrate, to allow for configuration of the base 502 in the illustrated contour and/or other contours. As also shown in FIG. 5B, the energy absorbing member 500 is disposed such that the biased members 504 extend from the base 502 toward the interior trim panel 508. FIG. 5B also shows an example of a solid member 512, which may be disposed in a space between the trim panel 508 and the frame 510. Without limitation, the solid member 512 may be coupled to the frame 510. In other examples, the energy absorbing member 500 may be integrated into the interior trim paneling 508 or other vehicle component. That is, it may be beneficial to incorporate the energy absorbing member 500 into the vehicle component. In such a case, the energy absorbing member 500 may be less prone to shifting and/or moving, and/or may be easier to install, for example.

FIG. 5B also demonstrates operation of the energy absorbing member 500 during an impact event, such as a collision, a braking event, or the like, involving a vehicle. Specifically, FIG. 5B includes a schematic representation of an occupant 514. During an impact event, a head 516 of the occupant 514 contacts the trim panel 508 proximate the solid member 512. When the head 516 contacts the trim panel 508 with a sufficient force, the trim panel 508 deflects and contacts the biased members 504. With a continued application of force, the biased members 504 deflect toward the base 502, e.g., against the biasing force maintaining the biased members 504 in their normal position spaced from the base 502. This deflection or movement of the biased members 504 toward the base 502 dissipates energy from the impact, effectively resulting in a cushioning of the impact.

As will be appreciated, in the absence of the energy absorbing member 500 the impact of the head 516 on the trim panel 508 may cause the trim panel 508 (and thus the head 516 of the occupant 514) to contact the solid member 512 and/or the frame, resulting in potential harm to the occupant 514. As noted above, some conventional applications may place foam or a resilient block between the energy absorbing member 500, e.g., to act as a cushion. In some alternative approaches, an inflatable bladder, such as an airbag or the like, may be used. However, such solutions require a relatively large distance between the trim panel 508 and the solid member 512, which is often not available. Moreover, in those conventional solutions the cushioning member may be permanently deformed after an impact event, necessitating removal and replacement. In contrast, the energy absorbing members of aspects of this disclosure may be reusable, e.g., because the biased members can return to their biased state when the force associated with the impact is removed.

Figure 6:
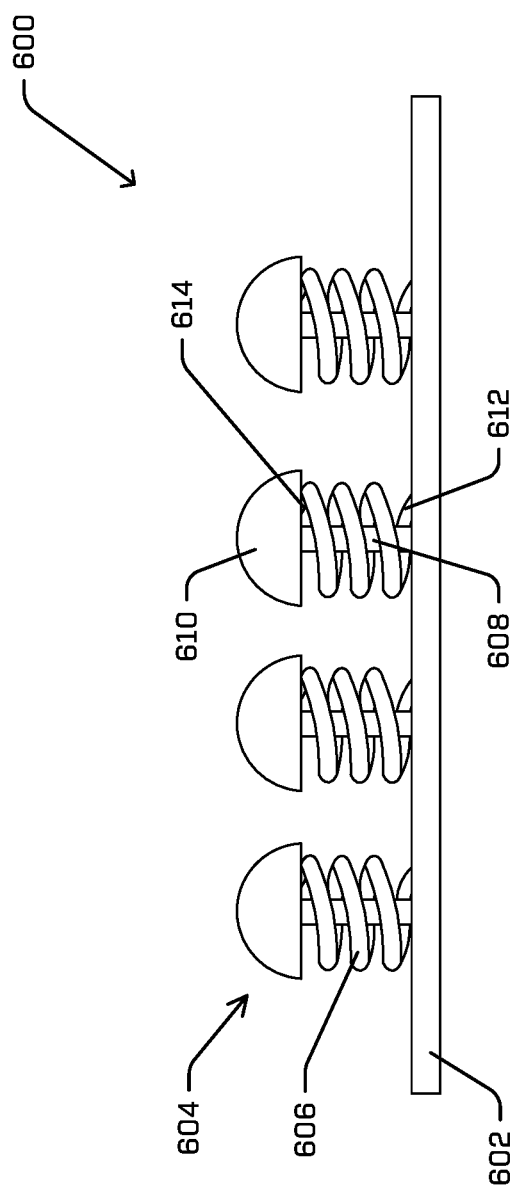
FIG. 6 is a side elevation view of an additional example of an energy absorbing member, in accordance with additional aspects of this disclosure.

FIG. 6 shows another example of an alternative energy absorbing member 600. In examples, the energy absorbing member 600 can be used similarly to the other energy absorbing members detailed herein. For instance, and without limitation, the energy absorbing member 600 may be positioned between a trim panel and a frame of a vehicle or other solid member.

In the example of FIG. 6, the energy-absorbing member 600 includes a base 602 and a number of biased members 604 extending from the base 602. Biasing members 606 bias at least a portion of the biased members 604 away from the base 602. In this example, each of the biased members 604 includes a post 608. Moreover, a cap 610 is disposed at a distal end of the post 608. In the example, the biasing members 606 are compression springs that at a first end 612 contact the base 602 and at a second end 614 contact the cap 610. The cap 610 is movable relative to the base 602, and thus the biasing member 606 biases the cap 610 away from the base 602. In operation, an impact with the cap 610, e.g., generally in a downward vertical direction in the orientation of FIG. 6, may cause the cap 610 to move relatively closer to the base 602, e.g., against a biasing force of the biasing member 606. In examples, the energy absorbing member 600 may act to dissipate or cushion the impact force, as described herein. Unlike other examples, in the example of FIG. 6, the biased members 604 are biased substantially perpendicular to the base 602.

In some examples, the post 608 may be fixed to the base 602 and the cap 610 may be movable relative to the post 608 (and the base 602). In other examples, the cap 610 may be fixed to the post 608, and the integral post 608/cap 610 assembly may be movable relative to the base 620. In other examples, there may not be a post 608 and instead the cap 610 may be coupled to the compression spring or other biasing member 606. That is, the post 608 may be omitted in some instances, with the cap 610 coupled to the biasing member 606. In such an example, the biased members 604 may be less structurally rigid and/or more customizable such that they are better suited to match a contour of an interior trim panel or fit in a constrained space, for example. Other arrangements also are contemplated.

Example Clauses

Any of the example clauses in this section may be used with any other of the example clauses and/or any of the other examples or embodiments described herein.

A: An example vehicle includes: a frame member; an interior trim component spaced from the frame member to define a space between the frame member and the interior trim panel and the frame member; a solid member disposed at least partially in the space; and an energy absorbing member disposed in the space between the interior trim panel and the solid member. The energy absorbing member includes: a base coupled to at least one of the interior trim panel or the frame member; and at least one fin protruding from the base and biased in a first direction away from the base, wherein the at least one fin is configured to deflect in response to an impact to the interior trim panel proximate the solid member to at least partially mitigate the impact.

B: The vehicle of example A, wherein the base comprises a first body member coupled to a second base member and the at least one fin is configured to move relative to the first base member and the second base member.

C: The vehicle of example A or example B, wherein the first base member and the second base member define an opening and the at least one fin extends at least partially through the opening.

D: The vehicle of any one of example A through example C, wherein the first base member is configured to pivot relative to the second base member about a pin coupling the first base member and the second base member.

E: The vehicle of any one of example A through example D, wherein the energy absorbing member further comprise a biasing member biasing the at least one fin in the first direction.

F: The vehicle of any one of example A through example E, wherein a first unit and a second unit comprise a first base, the first base comprising: a first body and the at least one fin comprises at least one first fin, the energy absorbing member further comprising: a second base coupled to the first base; and at least one second fin protruding from the second body and biased away from the base; and wherein the first unit and the second unit are substantially identical.

G: An example energy absorbing member includes: a base and a biased member extending from and biased from the base. The base is configured for coupling to a vehicle such that the biased member is disposed between a trim panel and a frame of the vehicle, and the biased member is configured to dissipate energy from an impact with the trim panel proximate the energy absorbing member.

H: The energy absorbing member of example G, wherein the biased member comprises a fin, the energy absorbing member further comprising: a biasing member biasing the fin from the base.

I: The energy absorbing member of example G or example H, wherein: the base comprises a first base member coupled to a second base member; the first base member and the second base member define an opening; and the biased member extends at least partially through the opening.

J: The energy absorbing member of any one of example G through example I, wherein the first base member is movable relative to the second base member.

K: The energy absorbing member of any one of example G through example J, wherein relative movement of the first base member and the second base member alters a size of the opening.

L: The energy absorbing member of any one of example G through example K, wherein the first base member is movable relative to the second base member about a longitudinal axis, and the biased member rotates about the longitudinal axis.

M: The energy absorbing member of any one of example G through example L, wherein the biased member is formed integrally with the base.

N: The energy absorbing member of any one of example G through example M, wherein the base is a first base, the biased member is a first biased member, and the energy absorbing member is a first energy absorbing member, the first energy absorbing member further comprising: a second base coupled to the first base; and a second biased member extending from the second base.

O: The energy absorbing member of any one of example G through example N, further comprising a second energy absorbing member, the second energy absorbing member comprising: a third base coupled to any one of the first base or the second base; a third biased member extending from the third base; and wherein the first energy absorbing member and the second energy absorbing member are substantially identical.

P: The energy absorbing member of any one of example G through example O, further comprising: a mounting member configured to mount the base to at least one of the trim panel or the frame.

Q: A device comprising: a base; a biased member extending form the base; and a biasing member applying a biasing force to the biased member to bias the biased member in a direction away from the base, wherein the biased member is configured to engage a portion of an interior trim panel of a vehicle upon an impact to the portion of the interior trim panel.

R: The device of example Q, further comprising a pin coupling the biased member to the base, wherein the biased member pivots about the pin against the biasing force in response to the impact.

S: The device of example Q or example R, wherein: the base comprises a first base portion and a second base portion; and the pin couples the first base portion to the second base portion.

T: The device of any one of example Q through example S, further comprising a mounting member configured to mount the device to at least one of the interior trim panel or a frame of the vehicle.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle, comprising:
   a frame member;
   an interior trim panel spaced from the frame member to define a space between the interior trim panel and the frame member;
   a solid member disposed at least partially in the space; and
   an energy absorbing member disposed in the space between the interior trim panel and the solid member, the energy absorbing member comprising:
   a base coupled to at least one of the interior trim panel or the frame member, the base comprising a first base member coupled to a second base member to define a volume; and
   at least one fin disposed at least partially in the volume and including a portion protruding from the base to a position spaced from the base and in the space between the interior trim panel and the frame member, wherein the at least one fin is biased in a first direction relative to the base,
   wherein the at least one fin is configured such that the portion protruding from the base of the at least one fin is contacted and deflects in a second direction relative to the base in response to an impact to the interior trim panel proximate the solid member to at least partially mitigate the impact.

2. The vehicle of claim 1, wherein the at least one fin is configured to move relative to the first base member and the second base member.

3. The vehicle of claim 2, wherein the first base member and the second base member define an opening and the at least one fin extends at least partially through the opening.

4. The vehicle of claim 2, wherein the first base member is configured to pivot relative to the second base member about a pin coupling the first base member and the second base member.

5. The vehicle of claim 1, wherein the energy absorbing member further comprises a biasing member biasing the at least one fin in the first direction.

6. The vehicle of claim 1, wherein
   the base comprises a first base and the at least one fin comprises at least one first fin, the energy absorbing member further comprising:
   a second base coupled to the first base; and
   at least one second fin protruding from the second base and biased away from the second base.

7. An energy absorbing member comprising:
   a base comprising a first base member and a second base member coupled together to define a volume; and
   a biased member at least partially disposed in the volume, wherein a portion of the biased member extends from the base, wherein the biased member is configured to pivot relative to the base, and wherein the portion of the biased member extending from the base is biased relative to the base,
   wherein the base is configured for coupling to a vehicle such that the base and the biased member are disposed between a trim panel and a frame of the vehicle, and
   wherein the biased member is configured to dissipate energy from an impact with the trim panel proximate the energy absorbing member.

8. The energy absorbing member of claim 7, wherein the biased member comprises a fin, the energy absorbing member further comprising:
   a biasing member biasing the fin from the base.

9. The energy absorbing member of claim 8, wherein the biasing member comprises a torsion spring disposed in the volume and configured to bias the biased member about an axis.

10. The energy absorbing member of claim 7, wherein:
    the first base member and the second base member define an opening; and
    the biased member extends at least partially through the opening.

11. The energy absorbing member of claim 10, wherein the first base member is movable relative to the second base member.

12. The energy absorbing member of claim 11, wherein relative movement of the first base member and the second base member alters a size of the opening.

13. The energy absorbing member of claim 12, wherein the first base member is movable relative to the second base member about a longitudinal axis, and the biased member rotates about the longitudinal axis.

14. The energy absorbing member of claim 7, wherein the base is a first base and the biased member is a first biased member, the energy absorbing member further comprising:
   a second base coupled to the first base; and
   a second biased member extending from the second base.

15. The energy absorbing member of claim 14, further comprising,
   a third base coupled to any one of the first base or the second base; and
   a third biased member extending from the third base.

16. The energy absorbing member of claim 7, further comprising:
   a mounting member configured to mount the base to at least one of the trim panel or the frame.

17. A device comprising:
   a base comprising a first base member and a second base member coupled together to define a volume;
   a biased member at least partially disposed in the volume, wherein a portion of the biased member extends from the base, wherein the biased member is configured to pivot relative to the base about an axis extending through the volume; and
   a biasing member applying a biasing force to the biased member to bias the portion of the biased member extending relative to the base in a first direction about the axis,
   wherein the biased member is configured to engage a portion of an interior trim panel of a vehicle upon an impact to the portion of the interior trim panel and a force associated with the impact causes the biased member to move against the biasing force in a second direction about the axis.

18. The device of claim 17, further comprising a pin coupling the biased member to the base,
   wherein the biased member pivots about the pin against the biasing force in response to the impact.

19. The device of claim 18, wherein:
   the pin couples the first base member to the second base member.

20. The device of claim 17, further comprising a mounting member configured to mount the device to at least one of the interior trim panel or a frame of the vehicle.

* * * * *